United States Patent
Chao et al.

(10) Patent No.: US 10,841,632 B2
(45) Date of Patent: Nov. 17, 2020

(54) SEQUENTIAL MULTIPLAYER STORYTELLING IN CONNECTED VEHICLES

(71) Applicant: Disney Enterprises, Inc., Burbank, CA (US)

(72) Inventors: Patricia Chao, Sunnyvale, CA (US); David Feder, San Francisco, CA (US); Alif Khalfan, Burbank, CA (US); Thomas M. DeKeyser, Sunnyvale, CA (US)

(73) Assignee: Disney Enterprises, Inc., Burbank, CA (US)

( * ) Notice: Subject to any disclaimer, the term of this patent is extended or adjusted under 35 U.S.C. 154(b) by 81 days.

(21) Appl. No.: 16/058,806

(22) Filed: Aug. 8, 2018

(65) Prior Publication Data

US 2020/0053400 A1    Feb. 13, 2020

(51) Int. Cl.
| | |
|---|---|
| *G06F 15/16* | (2006.01) |
| *H04N 21/238* | (2011.01) |
| *A63F 13/216* | (2014.01) |
| *H04W 4/021* | (2018.01) |
| *H04N 21/214* | (2011.01) |

(52) U.S. Cl.
CPC ..... *H04N 21/23805* (2013.01); *A63F 13/216* (2014.09); *H04N 21/2146* (2013.01); *H04W 4/021* (2013.01)

(58) Field of Classification Search
CPC .............. H04L 51/0097; H04N 21/414; H04N 21/4131
See application file for complete search history.

(56) References Cited

U.S. PATENT DOCUMENTS

| | | | |
|---|---|---|---|
| 1,004,331 | A | 9/1911 | Wright |
| 1,004,624 | A | 10/1911 | Brann |
| 5,299,291 | A | 3/1994 | Ruetz |
| 5,766,077 | A | 6/1998 | Hongo |
| 6,053,815 | A | 4/2000 | Hara |
| 6,200,138 | B1 | 3/2001 | Ando |

(Continued)

FOREIGN PATENT DOCUMENTS

| | | |
|---|---|---|
| IN | 1381KOL2007 | 4/2009 |
| JP | 2019065430 | 4/2019 |

(Continued)

OTHER PUBLICATIONS

Adam Hartley, 5 Predictions for the Future of in-Car Entertainment, Apr 9, 2019 [https://360.here.com/5-predictions-for-the-future-of-in-car-leisure-entertainment], (5 pages).

(Continued)

*Primary Examiner* — Yves Dalencourt
(74) *Attorney, Agent, or Firm* — Esplin & Associates, PC

(57) ABSTRACT

A system configured to provide users with interactive experiences on a set of one or more vehicles. The interactive experiences have narrative, leveling, or other persistent or shared aspects may be presented to users over a set of sessions in which the users (individually or as a group) are passengers in the set of one or more vehicles. The progress made by the users in a session is saved such that the users may continue the progress made in a following session in the set of one or more vehicles.

18 Claims, 6 Drawing Sheets

(56) References Cited

U.S. PATENT DOCUMENTS

| | | |
|---|---|---|
| 6,691,032 B1 | 2/2004 | Irish |
| 7,081,033 B1 | 7/2006 | Mawle |
| 7,266,847 B2 | 9/2007 | Pauker |
| 7,739,371 B2 | 6/2010 | Ikegaya |
| 7,837,544 B2 | 11/2010 | Tipping |
| 8,190,295 B1 | 5/2012 | Garretson |
| 8,758,126 B2 | 6/2014 | Bavitz |
| 8,831,228 B1 | 9/2014 | Agrawal |
| 8,882,595 B2 | 11/2014 | Chowdhary |
| 8,894,462 B2 | 11/2014 | Leyland |
| 8,941,690 B2 | 1/2015 | Seder |
| 8,988,465 B2 | 3/2015 | Baron |
| 9,007,400 B2 | 4/2015 | Takahashi |
| 9,008,310 B2 | 4/2015 | Nelson |
| 9,266,018 B2 | 2/2016 | Story |
| 9,293,042 B1 | 3/2016 | Wasserman |
| 9,327,189 B2 | 5/2016 | Bavitz |
| 9,361,730 B2 | 6/2016 | Keating |
| 9,610,510 B2 | 4/2017 | Comploi |
| 9,643,086 B2 | 5/2017 | Tipping |
| 9,669,302 B2 | 6/2017 | Park |
| 9,715,764 B2 | 7/2017 | Alaniz |
| 9,744,448 B2 | 8/2017 | Mullen |
| 9,814,991 B2 | 11/2017 | Van Winkle |
| 9,821,920 B2 | 11/2017 | Cole |
| 9,922,466 B2 | 3/2018 | Donnelly |
| 10,019,070 B2 | 7/2018 | Szczerba |
| 10,025,431 B2 | 7/2018 | Li |
| 10,059,347 B2 | 8/2018 | Thieberger-Navon |
| 10,140,464 B2 | 11/2018 | Lebeck |
| 10,162,998 B2 | 12/2018 | Park |
| 10,310,600 B2 | 6/2019 | Hong |
| 10,339,711 B2 | 7/2019 | Ng-Thow-Hing |
| 10,366,290 B2 | 7/2019 | Wang |
| 10,376,776 B2 | 8/2019 | Lowe |
| 10,585,471 B2 | 3/2020 | Reichow |
| 10,589,625 B1 | 3/2020 | Goslin |
| 2003/0027636 A1 | 2/2003 | Covannon |
| 2003/0130031 A1 | 7/2003 | Yoshida |
| 2004/0059922 A1 | 3/2004 | Harris |
| 2005/0059483 A1 | 3/2005 | Borge |
| 2006/0052153 A1 | 3/2006 | Vlazny |
| 2006/0224456 A1 | 10/2006 | Walker |
| 2006/0277100 A1 | 12/2006 | Parham |
| 2007/0060233 A1 | 3/2007 | Liccardo |
| 2007/0087834 A1 | 4/2007 | Moser |
| 2007/0093299 A1 | 4/2007 | Bergeron |
| 2007/0139671 A1 | 6/2007 | Stevens |
| 2007/0197275 A1 | 8/2007 | Gagner |
| 2007/0206023 A1 | 9/2007 | Street |
| 2008/0105751 A1 | 5/2008 | Landau |
| 2008/0148067 A1 | 6/2008 | Sitrick |
| 2008/0200244 A1 | 8/2008 | Rowe |
| 2008/0309010 A1 | 12/2008 | Bowling |
| 2008/0311983 A1 | 12/2008 | Koempel |
| 2009/0069084 A1 | 3/2009 | Reece |
| 2009/0079705 A1 | 3/2009 | Sizelove |
| 2009/0137323 A1 | 5/2009 | Fiegener |
| 2009/0176566 A1 | 7/2009 | Kelly |
| 2009/0313358 A1 | 12/2009 | Shepherd |
| 2010/0033427 A1 | 2/2010 | Marks |
| 2010/0093421 A1 | 4/2010 | Nyman |
| 2010/0098092 A1 | 4/2010 | Luo |
| 2010/0130296 A1 | 5/2010 | Ackley |
| 2010/0182340 A1 | 7/2010 | Bachelder |
| 2010/0324984 A1 | 12/2010 | Pelto |
| 2010/0331721 A1 | 12/2010 | Epley |
| 2011/0098092 A1 | 4/2011 | Reiche, III |
| 2011/0183754 A1 | 7/2011 | Alghamdi |
| 2011/0216948 A1 | 9/2011 | Yalla |
| 2012/0089275 A1 | 4/2012 | Yao-Chang |
| 2012/0142415 A1 | 6/2012 | Lindsay |
| 2012/0256945 A1 | 10/2012 | Kidron |
| 2012/0264518 A1 | 10/2012 | Rouille |
| 2012/0289122 A1 | 11/2012 | Elliott |
| 2012/0295703 A1 | 11/2012 | Reiche |
| 2012/0295704 A1 | 11/2012 | Reiche |
| 2013/0083003 A1 | 4/2013 | Perez |
| 2013/0083061 A1 | 4/2013 | Mishra |
| 2013/0157607 A1* | 6/2013 | Paek ............... H04W 4/90 |
| | | 455/404.1 |
| 2013/0166147 A1 | 6/2013 | Chudzinski |
| 2013/0274024 A1 | 10/2013 | Geylik |
| 2013/0296058 A1 | 11/2013 | Leyland |
| 2014/0067208 A1* | 3/2014 | Klappert ............ H04N 21/4131 |
| | | 701/49 |
| 2014/0100020 A1 | 4/2014 | Carroll |
| 2014/0100029 A1 | 4/2014 | Reiche |
| 2014/0128144 A1 | 5/2014 | Bavitz |
| 2014/0128145 A1 | 5/2014 | Hwang |
| 2014/0162785 A1 | 6/2014 | Reiche |
| 2014/0274313 A1 | 9/2014 | Bala |
| 2014/0295963 A1 | 10/2014 | Ishikawa |
| 2014/0342790 A1 | 11/2014 | Kim |
| 2015/0003609 A1 | 1/2015 | Nelson |
| 2015/0024852 A1 | 1/2015 | Pacey |
| 2015/0065237 A1 | 3/2015 | Hohn |
| 2015/0080125 A1 | 3/2015 | Andre |
| 2015/0097864 A1 | 4/2015 | Alaniz |
| 2015/0145671 A1 | 5/2015 | Cohen |
| 2015/0174479 A1 | 6/2015 | Reiche |
| 2015/0202962 A1 | 7/2015 | Habashima |
| 2015/0294505 A1 | 10/2015 | Atsmon |
| 2015/0346722 A1 | 12/2015 | Herz |
| 2016/0042607 A1 | 2/2016 | McCoy |
| 2016/0071397 A1 | 3/2016 | Logan |
| 2016/0096114 A1 | 4/2016 | Van Winkle |
| 2016/0189444 A1* | 6/2016 | Madhok .............. G07C 5/02 |
| | | 701/36 |
| 2016/0199730 A1 | 7/2016 | Olson |
| 2016/0206955 A1 | 7/2016 | Goslin |
| 2016/0206957 A1 | 7/2016 | Goslin |
| 2016/0299567 A1 | 10/2016 | Crisler |
| 2016/0310839 A1 | 10/2016 | Leyland |
| 2016/0313792 A1 | 10/2016 | Siegel |
| 2016/0346704 A1 | 12/2016 | Wagner |
| 2017/0021273 A1 | 1/2017 | Rios |
| 2017/0021282 A1 | 1/2017 | Comploi |
| 2017/0045946 A1 | 2/2017 | Smoot |
| 2017/0050743 A1 | 2/2017 | Cole |
| 2017/0068311 A1 | 3/2017 | Evans |
| 2017/0072316 A1 | 3/2017 | Finfter |
| 2017/0103571 A1 | 4/2017 | Beaurepaire |
| 2017/0106288 A1 | 4/2017 | Reiche |
| 2017/0132334 A1 | 5/2017 | Levinson |
| 2017/0158023 A1 | 6/2017 | Stevanovic |
| 2017/0166221 A1 | 6/2017 | Osterman |
| 2017/0253252 A1 | 9/2017 | Donnelly |
| 2017/0330034 A1 | 11/2017 | Wang |
| 2017/0352185 A1 | 12/2017 | Bonilla Acevedo |
| 2018/0040162 A1 | 2/2018 | Donnelly |
| 2018/0040163 A1 | 2/2018 | Donnelly |
| 2018/0043272 A1 | 2/2018 | Van Winkle |
| 2018/0089901 A1* | 3/2018 | Rober ................. B60K 37/06 |
| 2018/0231973 A1 | 8/2018 | Mattingly |
| 2019/0065970 A1 | 2/2019 | Bonutti |
| 2019/0075437 A1 | 3/2019 | Shaikh |
| 2019/0101976 A1 | 4/2019 | Reichow |
| 2019/0157607 A1* | 5/2019 | Kim .................. H01L 51/0097 |
| 2019/0220674 A1 | 7/2019 | Khalfan |

FOREIGN PATENT DOCUMENTS

| | | |
|---|---|---|
| WO | 2007101785 A1 | 9/2007 |
| WO | 2018128946 A1 | 7/2018 |

OTHER PUBLICATIONS

Lambros Sarakis, et al., Technological Educational Institute of Sterea Ellada; Hellenic Open University; Synelixis Solutions Ltd., Providing Entertainment Applications in VANET Environments, Mar 2, 2016 [https://ieeexplore.ieee.org/document/7422403] (8 pages).

(56) References Cited

OTHER PUBLICATIONS

Raman Mehta, IDG Communications, Inc., Augmented Reality—Next Frontier for Competitive Advantage, Feb. 14, 2017 [https://www.cio.com/article/3169685/augmented-reality-next-frontier-for-competitive-advantage.html], (5 pages).

"Battle Circuit", Capcom, available at <<https://web.archive.org/web/20000111 073021 /http://www.capcom.co.jp/newproducts/arcade/battle/bs-top. html>> (Orig in al Japanese web page followed by English translation), 4 pages.

"Sun CriesSun Cries", http://web.archive.org, Mar. 9, 2012 (Mar. 9, 2012), XP055152538, Retrieved from the Internet: URL: http://web.archive.org/web/20120309212642/http://www.suncries.com/skylanders-hac king [retrieved on Nov. 12, 2014] (8 pgs).

"Video Game/ Battle Circuit", TV Tropes, available at <<https://web.archive.org/web/20150114005112/http://tvtropes.org/pmwiki/pmwiki .php/VideoGameBattleCircuit>> (4 pages).

Dagamant, 'Skylanders Hacking', Retrieved from the Internet http://web.archive.ora/web/20120309212642/http://www,suncries.com/skvlaners-hack ing Feb. 27, 2012, XP055152538, 8 pages.

Extended European Search Report issued in European Patent Application No. 14175300.4, dated Nov. 19, 2014. (6 pgs).

Kloster, Benjamin, 'Wanted: Encryption Scheme for Copy Protection Purposes', Retrieved from the Internet http://stackoverflow.com/questions/14529732/wanted-encrYption-scheme-for-copy-protection-purposes, Jan. 25, 2013, XP055152568, 2 pages.

Apple (Developing Wireless CarPlay System, https://developer.apple.com/videos/play/wwdc2017/717/WWDC 2017, video and slide). (Year: 2017).

NPX "Software-Apple-Carplay: Software Technology for CarPlay", https://www.nxp.com/design/software/ embedded-software/software-technology-for-carplay:Software-Apple-Carplay (Year: 2020), 3 pages.

Google search "Iphone Figurine" (Year: 2020), 1 page.

\* cited by examiner

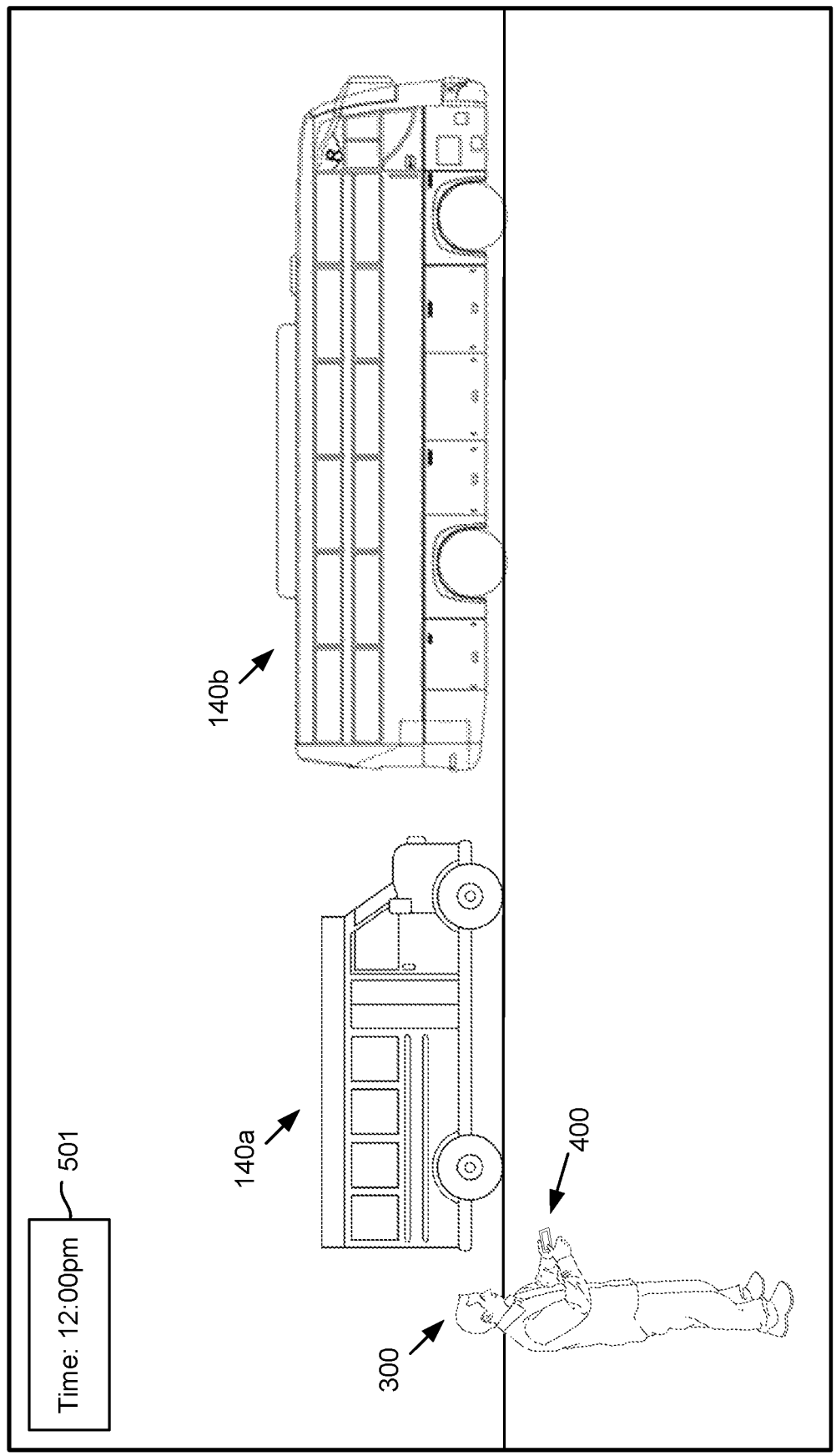

SEQUENTIAL MULTIPLAYER STORYTELLING IN CONNECTED VEHICLES

FIELD OF THE DISCLOSURE

The present disclosure relates to providing users with interactive experiences on a set of one or more vehicles.

BACKGROUND

A user may save game progress of a game so that they may continue the game at a later time. The user may save the game manually, or the game may automatically save the game progress for the user. The game progress may be automatically saved periodically with time or when a game event occurs. The user may access the saved game progress at will. Dynamically determining when, where, and how the user may be provided with the game with the saved game progress based on external factors of the game may be difficult.

SUMMARY

One aspect of the present disclosure relates to sequential storytelling across a set of one or more vehicles such that interactive experiences that have narrative, leveling, or other persistent or shared aspects may be presented to users over a set of sessions in which the users (individually or as a group) are passengers in the set of one or more vehicles. As used in this context, "storytelling" may refer to broader presentation of interactive media than simply audible, or even visual, recitation or representation of a story. The users may include a first user. The first user may be provided with interactive experiences on the set of one or more vehicles. The interactive experiences may be provided by a set of virtual content and/or other content. The virtual content may provide a digital game (such as a video game), a video, and/or other interactive media. A set of physical effects may be provided concurrently with the set of virtual content. The physical effects including one or more tactile effects, environmental effects, and/or other effects. The physical effects provided concurrently with the set of virtual content may be correspond to the context of content provided by the set of virtual content.

The first user may be provided with the first virtual content while at, near, or inside a first vehicle of the set of one or more vehicles. The first user may be a passenger of the first vehicle. The first vehicle operating in the real world (such as being driven along a route). The first user may participate in a first session of the first virtual content and progress toward a goal of the first virtual content. The first session may be a first duration of time the first user spent interacting with the first virtual content. The progress made by the first user toward the goal in the first session may be saved. The first user may continue their progress toward the goal of the first virtual content in a second session of the first virtual content after the first session. The second session may occur at a point in time after the first session. The first user may participate in the second session of the of the first virtual content while at, near, or inside the first vehicle and/or another vehicle of the set of one or more vehicles.

In some implementations, a system configured to provide users with interactive experiences on a set of one or more vehicles may include one or more of one or more servers, one or more vehicles, one or more external resources, and/or other components. In some implementations, the servers may include one or more of electronic storages, one or more physical processors, and/or other components. In some implementations, one or more physical processors may be configured by machine-readable instructions. Executing the machine-readable instructions may cause the one or more physical processors to provide users with interactive experiences on the set of one or more vehicles. The machine-readable instructions may include one or more computer program components. The one or more computer program components may include one or more of a vehicle component, a detection component, an identification component, a determination component, a presentation component, a progress component, and/or other components.

The electronic storages may be configured to store content information, progress information, and/or other information. The content information may define a set of virtual content. The set of virtual content may provide the interactive experiences. The set of virtual content may be provided to the users while the users may be at, near, or inside the set of one or more vehicles and/or at a point in time the set of one or more vehicles may be in operation. The individual virtual content of the set of virtual content may include a first virtual content, a second virtual content, and/or other virtual content. The individual virtual content of the set of virtual content may include individual progress lengths. Progress lengths of the set of virtual content may include an initial state and a goal state. The progress information may specify progress of users within the set of virtual content. The progress information may specify the progress made by a first user in the set of virtual content made toward goal state of the set of virtual content. The initial state of the set of virtual content may be the state of the set of virtual content for the first user prior to the commencement of user interaction with or participation in the set of virtual content. The user participation in the set of virtual content may include the first user provided user inputs to progress toward the goal state of the set of virtual content. The goal state of the set of virtual content may be an achievable goal within the set of virtual content. The progress information may specify progress made by the first user in the first virtual content toward a first goal state of the first virtual content.

The vehicle component may be configured to obtain vehicle status information of the individual vehicles in the set of one or more vehicles. The vehicle status information specifying one or more of a real-world location, operation mode, vehicle condition, operating route, operating time schedule, and/or other information of the individual vehicles in the set of one or more vehicles. The real-world location, operation mode, vehicle condition, and/or other information of the individual vehicles in the set of one or more vehicles may be specified by one or more sensors and/or systems in the vehicles. The operating route, operating time schedule, and/or other information of the vehicles may be storage the electronic storage, the vehicles, and/or other storage locations.

The detection component may be configured to obtain presence information and/or other information. The presence information may indicate the presence of the individual users at, near, or inside the set of one or more vehicles. The presence information may indicate the presence of the of the passengers of the set of one or more vehicles. The presence information may specify the identity of the individual users at, near, or inside the set of one or more vehicles. One or more sensors of the vehicle may generate output signals conveying the presence information and/or other information. Client computing devices of the users may communicate identification information conveying the presence information and/or other information.

The determination component may be configured to determine the portion of the set of virtual content to provide to the first user and/or other users at, near, or inside the set of one or more vehicles. The portion of the set of virtual content being the individual virtual content of the set of virtual content. The determination component may be configured to determine to provide the first user at, near, or inside the set of one or more vehicles with the first virtual content, the second virtual content, and/or the other virtual content of the set of virtual content. The determination component may determine to provide the first user with the virtual content such that the first user may start a first session in the determined virtual content and/or continue the progress made in the first session in the determined virtual content in a second session of the determined virtual content. The determination component may determine the virtual content of the set of virtual content to provide the first user based on the progress information, the presence information, the vehicle status information, and/or other information.

The presentation component may be configured to provide the users with the set of virtual content. The presentation component may be configured to provide the first user with the determined portion of the set of virtual content. The presentation component may be configured to provide the first user with the determined portion of the set of virtual content such that the first user may start the first session in the virtual content provided and/or continue the progress made in the first session in the virtual content provided in the second session of the virtual content provided. The presentation component may be configured to provide the first virtual content such that the first user may participate in the first virtual content provided in one or more sessions. The first user's participation in the first virtual content in the sessions may result in progress toward the first goal state of the first virtual content. The presentation component may be configured to provide the first user with the first virtual content responsive to the detection of the first user at, near, or inside the set of one or more vehicles.

The progress component may be configured to effectuate an update of the progress information. The progress component may be configured to effectuate an update of the progress information for the users. The progress component may be configured to effectuate the update of the progress information for the first user based on the progress made by the first user in the session. The progress component may be configured to effectuate the update of the progress information for the first user based on the progress made by the first user in the first session, the second session, and/or other sessions of the user's participation the first virtual content. The progress component may be configured to effectuate the update of the progress information contemporaneously with the progress made by the first user in the first virtual.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description and are not intended as a definition of the limits of the invention. As used in the specification and in the claims, the singular form of "a," "an," and "the" include plural referents unless the context clearly dictates otherwise.

BRIEF DESCRIPTION OF THE DRAWINGS

FIG. 3A illustrates a first user at, near, or inside a first vehicle of the set of one or more vehicles, in accordance with one or more implementations.

DETAILED DESCRIPTION

Figure 1:
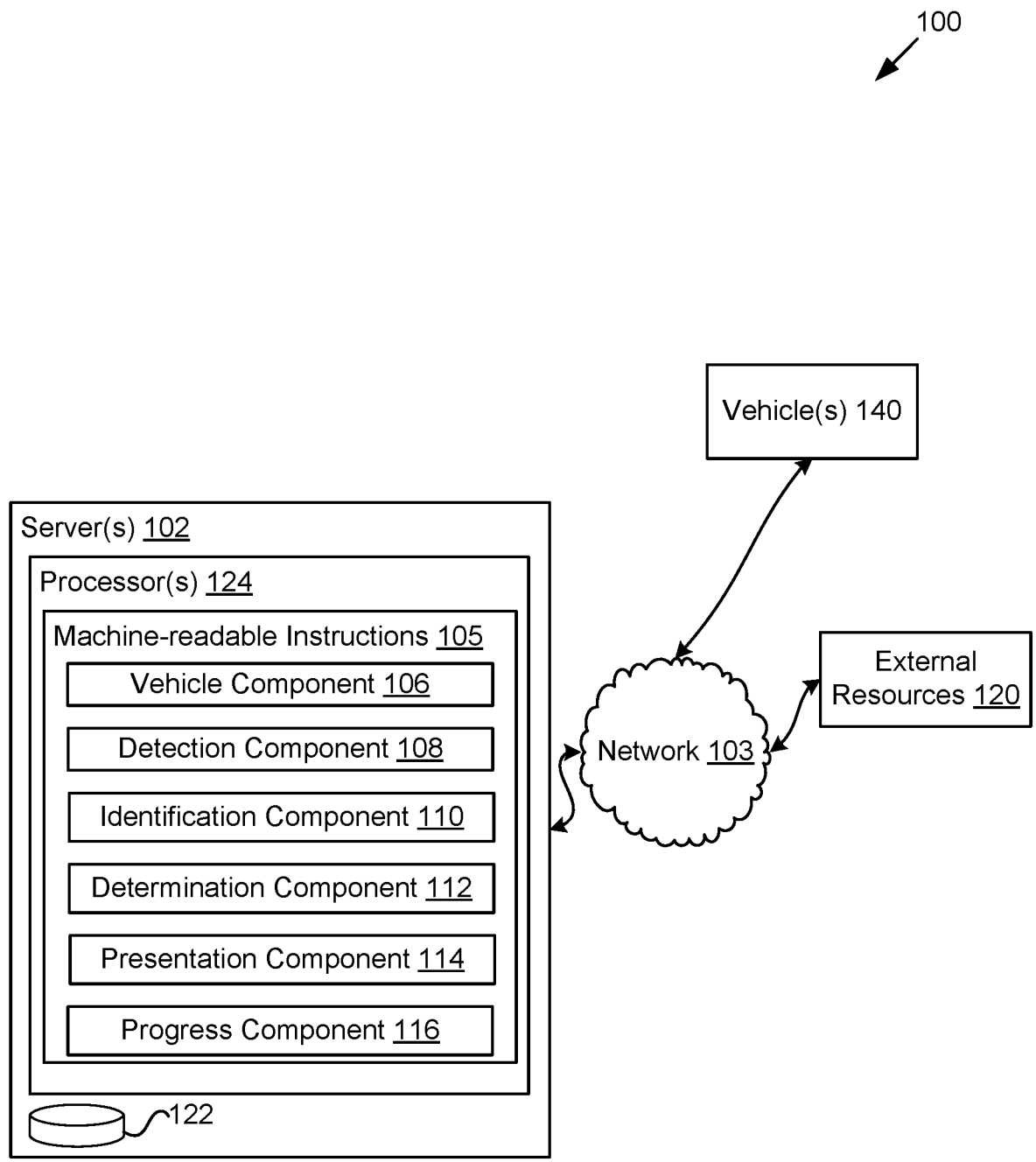
FIG. 1 illustrates a system for providing users with interactive experiences on a set of one or more vehicles, in accordance with one or more implementations.

FIG. 1 illustrates a system 100 configured to provide user(s) (individually or as a group) with interactive experiences on a set of one or more vehicles. The interactive experiences may have narrative, leveling, or other persistent or shared aspects may be presented to the user(s) over a set of sessions in which the user(s) are passengers in the set of one or more vehicles. The interactive experiences may be persistent or shared game and/or other interactive experiences presented to the user(s) that are passengers in the set of one or more vehicles. The user(s) may participate in the persistent or shared game over the set of sessions to achieve a common (e.g., shared) or private (e.g., unshared) goal in the game. The progress made by the user(s) in the individual sessions of the set of sessions may be saved such that the user(s) may continue the progress made in a following session of the individual sessions of the set of sessions. The user(s) may participate in the persistent or shared game over the set of sessions at, near, or inside some or all of the vehicles of the set of one or more vehicles.

In some implementations, system 100 configured to provide the user(s) with interactive experiences on the set of one or more vehicles may include one or more of one or more server(s) 102, one or more vehicle(s) 140, one or more external resources 120, and/or other components. In some implementations, server(s) 102 may include one or more of electronic storages 122, one or more physical processor(s) 124, and/or other components. In some implementations, one or more physical processor(s) 124 may be configured by machine-readable instructions 105. Executing machine-readable instructions 105 may cause one or more physical processors 124 to provide the user(s) with interactive experiences on the set of one or more vehicles. Machine-readable instructions 105 may include one or more computer program components. The one or more computer program components may include one or more of a vehicle component 106, a detection component 108, an identification component 110, a determination component 112, a presentation component 114, a progress component 116, and/or other components.

Vehicle(s) 140 may be one or more of a car, a bus, a shuttle, a train, an airplane, a vessel (such as a ship), and/or other vehicles. In some implementations, vehicle(s) 140 may be a motorized vehicle. In some implementations, vehicle(s) 140 may include one or more autonomous vehicle, semi-autonomous vehicle, non-autonomous vehicle, and/or other vehicles. In some implementations, vehicle(s) 140 may include one or more peripherals, one or more sensors, and/or other components. In some implementations, the one or more sensors of vehicle(s) 140 may include one or more image sensors, depth sensors, orientation sensors, position sensors, and/or other sensors. It is noted that vehicle(s) 140 may represent an individual vehicle and/or more than one vehicles that may be similarly configured as described herein.

In some implementations, the set of one or more vehicles include vehicle(s) 140 and/or other vehicles. The set of one or more vehicles may be vehicles of a vehicle fleet, vehicles performing the game job and/or task, vehicles of the same vehicle model, vehicles with the same hardware and/or operating systems, and/or other vehicles with shared features. By way of non-limiting example, the set of one or more vehicles may one or more shuttles, buses, and/or cars used to transport the user(s) and/or travel along a given route.

In some implementations, the one or more peripherals of vehicle(s) 140 may be removably coupled to vehicle(s) 140 and/or other devices. In some implementations, the one or more peripherals may be integrated in vehicle(s) 140 and/or other devices. The one or more peripherals and/or sensors may be removably and operationally connect to vehicle(s) 140. Connection may be wired and/or wireless. Operational connection may refer to a connection which may facilitate communication of information between vehicle(s) 140 and individual components.

The one or more peripherals may include one or more output devices, input devices, and/or other devices. The output devices may be configured to present the user(s) with the set of virtual content. The input devices may be configuring to obtain user input for participation in the set of virtual content. The output devices may be one or more of an audio output device and/or visual output device. The one or more input devices include one or more of a joystick, a sensor, a touch-enabled input device, a keypad, a controller, and/or other input devices. The audio output device may include one or more of speakers, alarms, sirens, headphones, and/or other audio systems configured to generate audible content. The visual output device may include one or more displays and/or other devices configured to provide the user(s) with visual content. The visual output device may be used to effectuate presentation of the set of virtual content. The input devices may be used to facilitate the user(s) participation in the set of virtual content.

In some implementations, client computing devices may be mobile devices such as smartphones, personal computers, and/or other devices. The client computing devices may be connected to vehicle(s) 140. Connection may be wired and/or wireless. Operational connection may refer to a connection which may facilitate communication of information between the client computing devices and vehicle(s) 140. In some implementations, the wireless connection may be one or more of a Wi-Fi connection, Bluetooth connection, and/or other wireless connections. In some implementations, client computing device (such as a smartphone) may serve as the output devices and/or input devices of vehicle(s) 140. In some implementations, the client computing device may effectuate presentation of the set of virtual content independent of vehicle(s) 140. For example, the set of virtual content may be effectuated by the client computing device or peripherals of vehicle(s) 140.

The client computing devices may include one or more displays, one or more of the audio output devices, one or more sensors, the one or more input devices, and/or other components. The individual client computing devices may include a first client computing device, a second client computing device, and/or other client computing devices. The first client computing device may be associated with a first user, the second client computing device may be associated with a second user, and/or the other client computing devices may be associated with other users. The user(s) may include the first user, the second user, and/or other users. The one or more sensors of the client computing devices may include one or more image sensors, depth sensors, orientation sensors, position sensors, and/or other sensors.

In some implementations, displays may be a device configured to effectuate presentation of the virtual content and/or other content. The displays include one or more of a touch-enabled display (e.g., the touchscreen), an LCD display, a LED display, an OLED display, a projector, and/or other displays. In some implementations, the display may be a video projector and/or other devices.

The one or more input devices may include one or more of a joystick, a sensor, a touch-enabled input device, a keypad, a controller, and/or other input devices. The one or more input devices may be configured obtain user input. The client computing devices provide vehicle(s) 140 with the user input.

A touch-enabled input device may be a touch screen and/or other devices. The touch screen may include one or more of a resistive touchscreen, a capacitive touchscreen, a surface acoustic wave touchscreen, an infrared touchscreen, an optical imaging touchscreen, an acoustic pulse recognition touchscreen, and/or other touchscreens. The touch-enabled input device may be configured to generate output signals conveying touch gesture information defining touch gesture inputs of the user.

Input devices (e.g., of the client computing devices and/or vehicle(s) 140) may be configured to obtain user input and/or other information. In some implementations, the user input may specify instructions for vehicle(s) 140. In some implementations, the user input may specify instructions for the individual client computing devices and/or other devices. The user input may include one or more of a body gesture input, touch gesture input, controller input, text input, audio input, and/or other inputs.

The body gesture input may include information defining movement of a body part of the user, including movement of a hand, arm, leg, lip, and/or other body parts of the user. In some implementations, the body gesture input may be obtained for visuals of the user. In some implementations, the body gesture input may convey sign language and/or other instructions. The sign language may specify instructions.

The touch gesture input may include information defining one or more movements. The movements may include one or more of a finger press, a finger tap, a finger swipe, a finger flick, a finger drag, a pinch, a touch-and-hold, a scroll, and/or other finger movements. These movements may similarly be carried out using a tool, such as a stylus.

The controller input may include information defining one or more of a key/button pressing input, a key/button tapping input, a swiping input, a flick input, a drag input, a key/button press-and-hold input, a scroll input, and/or other inputs from a controller. The controller input may include one or more of a movement of a mouse, a movement of a mouse while holding a button on the mouse, a press of one or more keys of a keyboard, a movement of a joystick, a movement of a joystick while holding of a button on a controller, and/or other controller inputs.

In some implementations, the text input may be obtained from a keyboard, an audio input device, and/or other devices. The text input may include one or more words in one or more languages. In some implementations, text input may be obtained from one or more voice recognition systems, natural language processing systems, gesture recognition systems, and/or other systems. The voice recognition systems may obtain audio signals from a user conveying one or more words and/or phrases. The natural language processing systems may obtain audio signals from a user and determine one or more words and/or phrases being conveyed by the user. The gesture recognition systems may obtain visual of the user conveying one or more words and/or phrases and/or instructions. The gesture recognition systems may interpret sign language.

The audio input may include audio information defining audio signals of the user. The audio signal of the user may be captured by a microphone and/or other audio capture devices. The audio signals from the user may be a voice command. In some implementations, instructions may be associated with the voice commands. In some implementations, audio input may be obtained from the one or more voice recognition systems, natural language processing systems, and/or other systems.

In some implementations, a user interface may be presented on the displays (of the client computing device and/or vehicle(s) 140). The user interface may include one or more graphical user interfaces. The user interface may be part of the virtual content provided to the user(s). The user may provide user input by interacting with the user interface. The user interface may facilitate the user(s) participation in the set of virtual content.

In some implementations, an image sensor may be configured to generate output signals conveying visual information of the real world and/or other information. The visual information may define visuals of the real world within a field of view of the image sensor and/or other content. The visuals may include depictions of the objects and/or surfaces. The visuals may be in the form of one or more of images, videos, and/or other visual information. The objects may include one or more people (such as the user(s)) and/or other objects. The field of view of the image sensors may be a function of a position and an orientation of the image sensors.

In some implementations, the image sensor may comprise one or more of a photosensor array (e.g., an array of photosites), a charge-coupled device sensor, an active pixel sensor, a complementary metal-oxide semiconductor sensor, an N-type metal-oxide-semiconductor sensor, and/or other devices.

In some implementations, the user(s) may be identified from the visual information. The user(s) may be identified from the visual information based on the appearance of the user(s) indicated by the visual information. For example, the individual user(s) may have an appearance that may or may not uniquely correspond to the objects.

In some implementations, a depth sensor may be configured to generate output signals conveying depth information of the real world and/or other information. The depth information may generate a three-dimensional map of a three-dimensional space. The three-dimensional map may be a representation of the three-dimensional space of the real world and/or include information of the three-dimensional space. The three-dimensional map may include depictions of the objects in the three-dimensional space. The three-dimensional map may specify the shape of the objects in the three-dimensional space. The depth information may define a set of points (also referred to as a point cloud) that may lie on surfaces of the objects within a field of view and/or range of the depth sensor and/or other content. In some implementations, depth information may specify individual ranges of the individual points within three-dimensional space. The field of view of the depth sensors may be a function of a position and an orientation of the depth sensors.

In some implementations, a depth sensor may comprise of one or more of a depth camera, a time-of-flight sensor, lidar systems, laser scanner, radar scanner, and/or other systems that may be configured to map a real-world environment.

In some implementations, the user(s) may be identified from the depth information. The user(s) may be identified from the depth information based on the appearance of the user(s) indicated by the depth information. For example, the individual user(s) may have an appearance indicated by the depth information that may or may not uniquely correspond to the user(s). The user(s) may be identified from the depth information based on the shape of the user(s) indicated by the depth information. For example, the individual user(s) may have a shape indicated by the depth information that may or may not uniquely correspond to the user(s).

An orientation sensor may be configured to generate output signals conveying orientation information of the sensors, vehicle(s) 140, and/or the client computing devices and/or other information. Orientation information derived from output signals of an orientation sensor may define an orientation. In some implementations, orientation may refer to one or more of a pitch angle, a roll angle, a yaw angle, and/or other measurements. An orientation sensor may include an inertial measurement unit (IMU) such as one or more of an accelerometer, a gyroscope, a magnetometer, and/or other devices.

The position sensor may be configured to generate output signals conveying location information of vehicle(s) 140, the client computing devices, and/or other devices. The location information may specify a real-world location of the position sensor. In some implementations, the position sensor may include one or more of a global positioning system (GPS) and/or other positioning systems. In some implementations, the location information may specify a distance of the position sensor from a real-world location.

Electronic storages 112 may be configured to store content information, progress information, and/or other information. Electronic storages 112 may be configured to provide the stored information. Electronic storages 112 may be configured to provide the stored information to the one or more components of server(s) 102, vehicle(s) 140, the client computing device associated with the user(s), and/or other devices.

Electronic storages 112 may be configured to enable modification to the stored information. Electronic storages 112 may be configured to enable an update to the stored information. Electronic storages 112 may obtain updated information to overwrite and/or replace the stored progress information. For example, electronic storages 112 may be configured to obtain updated information for modifying/updating the progress information.

The content information may define a set of virtual content and/or other information. The set of virtual content may provide the interactive experiences. The virtual content of the set of virtual content may provide one or more of a digital game (such as a video game), a video, and/or other content. The individual virtual content of the set of virtual content may include a first virtual content, a second virtual content, and/or other virtual content. By way of non-limiting example, the first virtual content may provide a first digital game, the second virtual content may provide a second digital game, and/or the other virtual content may provide other digital games and/or other content.

The virtual content providing the digital game and/or other interactive experience may include one or more virtual objects positioned throughout the topography of a simulated physical space. The virtual objects and the simulated physical space may make up game elements of the digital game. The virtual objects may include one or more of one or more virtual entity, one or more virtual structure, and/or other virtual objects. The user(s) may provide user input to participate in the digital game. The virtual content providing the video and/or other interactive experience may include one or more images and/or frames. The video may be an interactive video. The user(s) may provide user input to participate in the interactive video and influence the content provided in the interactive video. The virtual content may provide a story or tell a story. The story may be provided sequentially in one or more parts. The story may be part of the digital game, the video, and/or other interactive experience.

The simulated physical space may be in a three-dimensional space, two-dimensional space, and/or other simulated physical spaces. The simulated physical space may depict an environment. In some implementations, the simulated physical space may include a head-up display (HUD) overlaid on the three-dimensional, two-dimensional space, and/or other simulated physical spaces. A HUD may comprise of one or more of a mini-map, menu, one or more application information readings, and/or other information.

The virtual structure may include a depiction of a building, a store, a landmark, and/or other virtual structures. In some implementations, the virtual structure may be a representation of a real-world structure. In some implementations, the virtual structure may be a virtual-world structure. In some implementations, the virtual structure may include the virtual entity and/or other virtual content. For example, the virtual entity may be within and/or occupy the virtual structure.

The digital game may be a video game with one or more of a single player component, multiplayer game component, and/or other components. For example, the digital game with the multiplayer game component may be one or more of an online game a multiplayer game, a local co-op game, and/or other games. The digital game with single player component may be one or more of the online game, an offline game, a single player game, and/or other games.

The user(s) provided with the virtual content providing the digital game with a multiplayer game component may participate in the virtual content with other users in the set of one or more vehicles or the first vehicle of the set of one or more vehicles. For example, the passengers (e.g., the user(s)) of the set of one or more vehicles may participate in the persistent or shared game together to achieve a common (e.g., shared) or private (e.g., unshared) goal in the game. The persistent or shared game may be provided by the first virtual content.

The passengers of the set of one or more vehicles may be in a same game session of the shared game and may interact with one another in the same game session. The passengers of the set of one or more vehicles may be in the same vehicle of the set of one or more vehicles and/or different set of one or more vehicles when participating in the persistent or shared game together. For example, the passengers may all be in the first vehicle of the set of one or more vehicles, or some passengers may be in the second vehicle of the set of one or more vehicles when participating in the persistent or shared game together. In some implementations, the passengers of the set of one or more vehicles may be participating in different same game session of the shared game. The game session the passengers of the set of one or more vehicles may be participating in may be based on the progress made by the user in the set of one or more vehicles.

The set of virtual content may be provided to the user(s) at, near, or inside the set of one or more vehicles. The user(s) at, near, or inside the set of one or more vehicles may be a user on the set of one or more vehicles, in proximity to the set of one or more vehicles, in a given range from the set of one or more vehicles, adjacent to the set of one or more vehicles, and/or at, near, or inside the set of one or more vehicles. The user(s) at, near, or inside the set of one or more vehicles may be a passenger of the set of one or more vehicles.

The set of virtual content may be provided to the user(s) during the operation of the vehicles of the set of one or more vehicles. For example, the set of virtual content may be provided to the user(s) at, near, or inside the first vehicle of the of the set of one or more vehicles concurrently with the operation of the first vehicle.

The individual virtual content of the set of virtual content may include individual progress lengths. Progress length of the set of virtual content may include an initial state and a goal state. For example, the first virtual content may have a first progress length, the second virtual content may have a second progress length, and/or the other virtual content may have other progress lengths. The first progress length may include a first initial state and a first goal state. The first progress length may include one or more progress points between the first initial state and the first goal state of the first virtual content. The one or more progress points may indicate the progress made by the user(s) toward the first goal state of the first virtual content. In some implementations, the one or more progress points may indicate the progress made from the first initial state of the first virtual content.

The initial state of the set of virtual content may be the state of the set of virtual content for the first user prior to the commencement of user interaction with or participation in the set of virtual content. The user participation in the set of virtual content may include the first user provided user inputs to progress toward the goal state of the set of virtual content. For example, the first initial state of the first virtual content may be a beginning of the first virtual content prior to any progress being made in the first virtual content or participation from the user(s).

By way of non-limiting example, the first initial state of the of the first virtual content of the digital game may be the very start of a new game, wherein the no progress was made in the new game by the user(s) or no participation from the user(s). By way of non-limiting example, the first initial state of the of the first virtual content of a video may be a beginning of the video, wherein no progress was made in the viewing of the video.

The goal state of the set of virtual content may be achievable goals within the set of virtual content. The goal state of the set of virtual content may be achievable goals by the user(s) through user interaction with and/or participation in the set of virtual content. The goal state may be the state of the set of virtual content for the end of the set of virtual content. For example, the first goal state of the first virtual content may be an ending and/or conclusion of the first virtual content. By way of non-limiting example, the first goal state of the first virtual content of the digital game may be the completion of the game. By way of non-limiting example, the first goal state of the of the first virtual content of the video may be an end and/or completion of the video.

In some implementations, the end and/or the completion of the game may include the user(s) losing the game, completing one or more game criteria for ending, concluding, and/or completing the game, and/or other endings of the game. The user(s) may achieve and/or reach the goal state of the game through interactions with the virtual content of the set of virtual content provided. The user may satisfy the one or more game criteria through interaction with the virtual content to achieve the goal state. For example, if the user(s) are required to satisfy first and second game criteria to complete the game, the satisfaction of the first and second game criteria may achieve the goal state.

By way of non-limiting example, the first progress length of the first virtual content of the video may be defined in terms of time durations and/or frame numbers. For example, the video of the first virtual content may include a video having a time duration of 60 seconds. The first virtual content may include a video having 1800 video frames. The first virtual content having 1800 video frames may have a play time duration of 60 seconds if viewed at 30 frames/second. Other visual progress lengths, time durations, and frame numbers are contemplated. In this example. the initial state of the first virtual content of the video may be at the time 0 second and/or the video frame 0. The goal state of the first virtual content of the video may be at the time 60 second and/or the video frame 1800.

The progress information may specify progress made by the individual users within the set of virtual content. The progress information may specify progress made by the first user with the first virtual content, the second virtual content, and/or the other virtual content. The progress information may specify progress of the first user with the set of virtual content between the initial state and the goal state of the set of virtual content. The progress of the first user with the first virtual content may specify the progress of the first user made toward the first goal state of the first virtual content, and/or the progress of the first user made from the first initial state. The progress information may specify a progress point in between the first initial state, and the first goal state may indicate the progress of the first user within the first virtual content. In some implementations, the first user may be provided with the first virtual content at the first progress point.

The progress of the first user with the first virtual content may indicate the progress made by the first user in a previous session with the first virtual content. For example, the progress of the first user with the first virtual content may indicate the progress made by the first user in a first session with the first virtual content. The first session with the first virtual content may begin at a point in time the first user commenced interacting and/or participating with the first virtual content. The first user may commence interacting and/or participating with the first virtual content at the first initial state. The progress made by the first user in the first session may be saved, such that the first may continue the progress made in the first session in a second session. The second session may be at a point in time after the first user's participation in the first session of the first virtual content.

The progress of the first user within the first virtual content may be based on the user interaction of the first user with the first virtual content. The progress information may specify progress of the first user within the first virtual content in real time and/or at discrete points in time. The progress information may specify the progress of the first user within the first virtual content concurrently with the first user interaction with the first virtual content.

The progress information may be used to determine a given point between the first initial state and the first goal state in the first virtual content to be provided to the first user the such that the first user may continue their progress made in the first virtual content. The given point in the first virtual content to be provided to the first user may be based on the progress made by the first user with the first virtual content. For example, the given point of the first virtual content to be provided to the first user in the second session may be the point in the first virtual content the first user ceased participating in the first virtual content in the first session.

In some implementations, the content information may define a set of physical effects and/or other information. The physical effects including one or more tactile effects, environmental effects, and/or other effects. The physical effects may provide the user with a physical stimulus. A tactile effect may induce a sense of touch by a user. For example, the tactile effect may include haptic feedback, force feedback, and/or other tactile effects. For example, the force feedback and/or haptic feedback may be provided from vehicle seats, vehicle handles, a client computing device of the user, and/or other devices.

The environmental effects may include a change in temperature, a change in lighting, a blast of air, and/or other effects. The environmental effects may be provided by one or more lighting systems, heating, ventilation, and air conditioning system, and/or other systems in a vehicle and/or around a user. The change in temperature may include increasing or decreasing the ambient temperature around the user or on a given body part of the user. The change in lighting may include increasing or decreasing the light intensity around the user or at a given location. The change in lighting may include changing the color of lighting around the user or at a given location. The change in lighting may include turning a lighting system on or off.

The set of physical effects may be provided concurrently with the set of virtual content. The set of physical effects may be associated with the set of virtual content. The physical effects provided concurrently with the set of virtual content may be correspond to the context of content provided by the set of virtual content. By way of non-limiting example, if a virtual content provided include an airplane flying through the clouds, the physical effects of a decrease in temperature around the user, a change in the lighting, and/or other effects may be provided concurrently with virtual content.

Vehicle component 106 may be configured to obtain vehicle status information of the individual vehicles in the set of one or more vehicles and/or other information. The vehicle status information specifying one or more of a real-world location, operation mode, vehicle condition, operating route, operating time schedule, and/or other information of the individual vehicles in the set of one or more vehicles. The real-world location, operation mode, vehicle condition, and/or other information of the individual vehicles in the set of one or more vehicles may be specified by one or more sensors and/or systems in the individual vehicles. The operating route, operating time schedule, and/or other information of the vehicles may be stored in electronic storage 122, the individual vehicles, and/or other storage locations.

The real-world location may be a real-world location (such as a geo-location) of the individual vehicles. In some implementations, the real-world location of the first vehicle may be determined based on the output signal of the one or more GPS on the first vehicle. For example, the position sensor on the first vehicle may generate output signals specifying the real-world location of the first vehicle. In some implementations, the real-world location of the first vehicle may be determined based on the signal strength of signals received by the first vehicle. The first vehicle may include a transponder for receiving signals from reference points in the real world. The reference points in the real world may be a signal tower and/or other fixed signal transmission devices. The first vehicle may triangulate its real-world location based on the signal received by the reference points. The first vehicle may triangulate its real-world location based on the signal strength of the signal received by the reference points. In some implementations, the client computing device connected to the first vehicle may specify the real-world location of the first vehicle. The client computing device connected to the first vehicle may be in the first vehicle. The client computing device may include the position sensor generating output signals specifying the real-world location of the client computing device. The client computing device may triangulate its real-world location. The first vehicle real-world location may be determined based on the real-world location of the connected client computing device by virtue of the client computing device being in the first vehicle.

The operation mode of the vehicles may specify driving settings, vehicle dynamics, and other settings in the vehicles. The operation mode may specify whether the vehicle may be operating in one or more of a performance setting, efficiency setting, comfort setting, and/or other settings. The operation mode may specify whether the vehicle may be operating with passengers. The operation mode may specify whether the vehicle may be operating on a street, a highway, a parking lot, dirt road, and/or other locations in the real world. The operation mode may specify whether the vehicle is parked, turned on, in reverse, in motion, and/or other in other operation modes.

In some implementations, the operation mode of the vehicles may specify a task being performed by a vehicle. For example, the task may include driving in low grip situations, picking up and/or dropping off passengers, and/or other tasks.

In some implementations, the operation mode of the first vehicle may be determined based on the output signals of the one or more sensors of the first vehicle, a control system of the first vehicle, and/or other devices of the first vehicle. Vehicle component 106 may be configured to obtain the information specifying the operation mode from the first vehicle from the first vehicle.

In some implementations, the operation mode of the first vehicle may specify whether the first vehicle may be in operation. For example, the operation mode of the first vehicle may specify whether the first vehicle may be switched on and/or in motion.

The vehicle condition may specify one or more vehicle engine condition, tire condition, suspension condition, fuel conditions, and/or other conditions. The vehicle condition of the first vehicle may be determined based on output signals of the one or more sensors of the first vehicle. The output signals of the one or more sensors of the first vehicle may convey the vehicle condition. In some implementations, the vehicle condition may be recorded and stored in a storage location in the first vehicle and/or other storage locations. Vehicle component 106 may be configured to obtain the vehicle condition from the first vehicle and/or other storage locations.

The operating route may specify a route the individual vehicles e should travel along in the real world. The route may be a path in the real world. The path may be predetermined. For example, the route may be a bus route in a city and/or park, and/or other routes. In some implementations, the operating route of the vehicle may be stored in the storage location in the vehicles and/or external resources 120. Vehicle component 106 may be configured to obtain the operating route of the vehicle may be stored in the storage location in the vehicles and/or external resources 120. In some implementations, individual vehicles may have individual operating route at a given point in time.

The operating time schedules specify when the individual vehicle should arrive given locations in the real world. In some implementations, the operating time schedules of the vehicle may be stored in the storage location in the vehicles and/or external resources 120. Vehicle component 106 may be configured to obtain the operating time schedules of the vehicle may be stored in the storage location in the vehicles and/or external resources 120. By way of non-limiting example, the operating time schedules specify when the vehicle should arrive one or more bus stations and/or other locations in the real world.

The vehicle status information may indicate whether the individual vehicles may be in operation. For example, the individual vehicles may be in operation when the engine is on. The individual vehicles may be in operation when the individual vehicles are being driven or flown when the individual vehicles leave a given location (such as a parking lot). The individual vehicles may be in operation when the individual vehicles may be traveling along the operating route. The individual vehicles may be in operation when the individual vehicles may be following the operating time schedules.

Detection component 108 may be configured to obtain presence information and/or other information. The presence information may indicate the presence of the user(s) at, near, or inside the set of one or more vehicles. The presence information may indicate the presence of the first user at, near, or inside the set of one or more vehicles. The presence information may indicate the presence of the first user at, near, or inside the first vehicle and/or other vehicles of the set of one or more vehicles. The presence information may indicate the presence of the first user at, near, or inside the first vehicle when the first user is at, near, or inside the first vehicle. The first user may be a passenger on the first vehicle. The presence information may specify the identity of the user(s) at, near, or inside the set of one or more vehicles.

The presence information may specify the identity of the first user at, near, or inside the set of one or more vehicles. The presence information may specify the identity of the first user at, near, or inside the first vehicle. The identity of the first user at, near, or inside the first vehicles may be specified by identifiers that uniquely correspond to the first user. The presence information may include the identifiers that uniquely correspond to the first user. The identifiers may include the appearance of the first user, an account of the first user, the first client computing device associated with the first user, identification cards or information associated with the first user, admission ticket associated with the first user, and/or other identifiers.

The presence information may be used to determine the portion of the set of virtual content to provide the first user with. The first user may be provided with the portion of the set of virtual content when the presence of the first user may be detected at, near, or inside the set of one or more vehicles. The presence information may indicate the presence of the first user at, near, or inside the set of one or more vehicles. In some implementations, the first user may be provided with first virtual content when the presence of the first user may be detected at, near, or inside the first vehicle or other vehicles of the set of one or more vehicles. The presence information may indicate the presence of the first user at, near, or inside the first vehicle or other vehicles of the set of one or more vehicles.

The presence information may be used to determine the progress made by the first user in the portion of the set of virtual content. The presence information may be used to determine the progress made by the first user in the first virtual content. The progress made by the first user in the first virtual content may correspond to the first user. The first virtual content with the progress made by the first user may be provided to the first user when the first user's presence may be detected at, near, or inside the set of one or more vehicles. The presence information may indicate the presence of the first user at, near, or inside the set of one or more vehicles.

In some implementations, detection component 108 may be configured to determine the presence information and/or other information. Detection component 108 may be configured to determine the presence information based on the output signals of the one or more sensors of the set of one or more vehicles, communication from the client computing device of the user(s), and/or other information.

In some implementations, the presence of the first user may be conveyed by the one or more sensors in the first vehicle and/or other vehicles. For example, the first user may be detected by the one or more sensors in the first vehicle and identified based on the output signals of the one or more sensors by detection component 108. For example, the first user in the first vehicle may be detected and identified by the one or more sensors in the first vehicle. The detection and identification of the first user by one or more sensors in the first vehicle may indicate that the first user may be at, near, or inside the first vehicle. The one or more sensors may capture information corresponding to the identifiers of the first user. Detection component 108 may be configured to generate the presence information based on the detection and identification of the first user via the one or more sensors.

In some implementations, detection component 108 may be configured to receive information conveyed by the output signals of the one or more sensors in the first vehicle and/or other information. The output signals of the one or more sensors in the first vehicle may convey information including identifiers of the first user. The detection and identification of the identifiers of the first user may indicate the first user may be at, near, or inside the first vehicles. Detection component 108 may be configured to identify the first user based on the appearance of the first user using one or more machine-learning techniques, image recognition techniques, and/or other techniques. Detection component 108 may be configured may be configured to generate the presence information based on the identification of the first user at, near, or inside the set of one or more vehicles.

In some implementations, the presence of the first user may be conveyed by the communication from the first client computing device and/or other devices. Detection component 108 may be configured to receive information communication from the first client computing device. Detection component 108 may be configured to receive information communication from the first client computing device at while the first client computing device may be at, near, or inside the set of one or more vehicles. The communication from the first client computing device may indicate that the first client computing device and the first user may be at, near, or inside the set of one or more vehicles. The communication from the first client computing device may convey the identifiers of the first user. For example, the communication from the first client computing device may convey the account of the first user, the admission ticket associated with the first user, and/or other identifiers of the first user. Detection component 108 may be configured to identify the first user based on the identifiers. Detection component 108 may be configured to generate the presence information based on the identifiers communicated by the first client computing device of the first user.

In some implementations, the communication from the first client computing device may convey the real-world location of the first client computing device or the first user. Detection component 108 may be configured to determine whether the real-world location of the first client computing device or the first user may be at, near, or inside the first vehicle and/or other vehicles of the set of one or more vehicles. Detection component 108 may compare the real-world location of the first client computing device and the first vehicle to determine whether the first client computing device may be at, near, or inside the first vehicle. Detection component 108 may be configured to generate the presence information based on the real-world location of the first client computing device or the first user.

Determination component 110 may be configured to determine the portion of the set of virtual content to provide to the first user and/or other users at, near, or inside the set of one or more vehicles. The portion of the set of virtual content being the individual virtual content of the set of virtual content. Determination component 110 may be configured to determine to provide the first user at, near, or inside the set of one or more vehicles with the first virtual content, the second virtual content, and/or the other virtual content of the set of virtual content. Determination component 110 may be configured to determine to provide the first user at, near, or inside the first vehicle and/or the other vehicles of the set of one or more vehicles with the set of virtual content. Determination component 110 may be configured to determine the portion of the set of virtual content to provide to the first user based on the progress information and/or the vehicle status information of the vehicle the first user may be at, near, or inside, and/or other information.

In some implementations, determination component 110 may be configured to determine the virtual content of the set of virtual content to provide to the first user based on the vehicle of the set of one or more vehicles the first user may be at, near, or inside. By way of non-limiting example, the first virtual content may be provided to the first user when the first user may be at, near, or inside the first vehicle, and the second virtual content may be provided to the first user when the first user may be at, near, or inside the second vehicle. It is noted that the first user at, near, or inside the first vehicle may not be limited to be provided with only the first virtual content. In some implementations, the first user at, near, or inside the first vehicle may be provided with the second virtual content. The virtual content provided to the first user at, near, or inside the first vehicle may be predetermined, determined by a designer and/or administrator of the set of virtual content, and/or another person with authority to deciding what virtual content should be provided at, near, or inside the first vehicle.

In some implementations, determination component 110 may determine the presence of the first user at, near, or inside the first vehicle and provide the first user with the virtual content of the set of virtual content the first user last interacted with. For example, determination component 110 may determine the virtual content the first user interacted with in the first session and provide the first user with the same virtual content in the second session such that the first user may continue the progress made in the first session. The progress information may indicate the virtual content of the set of virtual content the first user last interacted with. For example, the progress information may indicate the virtual content the first user interacted with in the first session. The virtual content provided may be the first virtual content.

Determination component 110 may determine the presence of the first user at, near, or inside the first vehicle and determine whether the first vehicle may be in operation. Responsive to the first user being at, near, or inside the first vehicle and the first vehicle being in operation (e.g., being driver and/or switched on), determination component 110 may determine to provide the first user with the first virtual content and/or other virtual content of the set of virtual content. Determination component 110 may determine the operation of the vehicle based on the vehicle status information and/or other information.

In some implementations, determination component 110 may determine to provide the portion of the set of virtual content to the first user based on the operating route of the first vehicle the first user may be at, near, or inside. In some implementations, the different virtual content of the set of virtual content may be provided to the first user at, near, or inside the first vehicle operating different routes. For example, the first virtual content may be provided to the first user at, near, or inside the first vehicle when the first vehicle is operating along a first route. Determination component 110 may be configured to determine the route of the first vehicle may be operating on based on the vehicle status information. Determination component 110 may be configured to determine the virtual content corresponding to the determined route to provide to the first user at, near, or inside the first vehicle.

In some implementations, determination component 110 may determine to provide the portion of the set of virtual content to the first user based on the real-world location of the first vehicle the first user may be at, near, or inside. In some implementations, the different virtual content of the set of virtual content may be provided to the first user at, near, or inside the first vehicle at different real-world locations of the first vehicle. For example, the first virtual content may be provided to the first user at, near, or inside the first vehicle when the first vehicle is at a first location in the real world. Determination component 110 may be configured to determine the real-world location of the first vehicle based on the vehicle status information. Determination component 110 may be configured to determine the virtual content corresponding to the determined real-world location to provide to the first user at, near, or inside the first vehicle.

In some implementations, determination component 110 may determine to provide the portion of the set of virtual content to the first user based on user selection of the virtual content of the set of virtual content. For example, the first user may select to be provided with the first virtual content. Determination component 110 may be configured to obtain information of a user selection of the virtual content of the set of virtual content and determine the virtual content of the set of virtual content to provide the first user based on the user selection. For example, determination component 110 may be configured to obtain information of the first user's selection of the first virtual content of the set of virtual content and determine to provide the first user with the first virtual content. Determination component 110 may be configured to obtain the user selection via the client computing platform, a user interface on the vehicle, and/or other devices.

In some implementations, determination component 110 may determine to provide the portion of the set of virtual content to the first user based the virtual content the first user may have access to. The first user may be provided with the virtual content of the set of virtual content which the first user may have access to. For example, if the user only has access to the first virtual content, then the first user at, near, or inside the first vehicle and/or other vehicles of the set of one or more vehicles may be provided with the first virtual content. In some implementations, the first user may be provided with the virtual content of the set of virtual content which the first user last interacted with. For example, if the user last interacted with the first virtual content, then the first user at, near, or inside the first vehicle and/or other vehicles of the set of one or more vehicles may be provided with the first virtual content.

In some implementations, determination component 110 may determine the progress made by the users in the sets of virtual content. Determination component 110 may determine the progress made by the users in the sets of virtual content based on the progress information and/or other information. In some implementations, determination component 110 may determine the progress made by the first user in the first virtual content. Determination component 110 may determine to provide the first user with the first virtual content based on the progress made by the first user in the first virtual content. Determination component 110 may determine to provide the first user with the first virtual content such that the first user may continue the progress made by the first user. The progress made by the first user in the first virtual content may be specified by the progress information. The progress made by the first user in the first virtual content may be indicated by the first progress point. The first progress point may indicate how far the first user progressed from the first initial state of the first virtual content.

For example, determination component 110 may determine to provide the first user with the virtual content such that the first user may start the first session in the first virtual content and/or continue the progress made in the first session in the first virtual content in the second session of the first virtual content. Determination component 110 may determine the first virtual content such that the first user may continue any progress by in the first virtual content.

By way of non-limiting example, if progress made by the first user was halfway through the first virtual content (e.g., halfway to the first goal state) in the first session, determination component 110 may determine to provide the first user with the first virtual content halfway through the first virtual content in the second session such that the first user may continue from the progress made in the first session. Determination component 110 may determine to provide the first user with the first virtual content halfway through the first virtual content such that the first user may continue toward achieving the goal state halfway through the first virtual content.

By way of non-limiting example, the first virtual content may be a digital game. The progress information of the first virtual content may specify the progress made by the first user in the digital game. The progress made by the first user in the digital game may be indicated by a save point (e.g., the first progress point) in the digital game. The save point may be where the first user last left off (e.g., stop interacting) with the first virtual content. Determination component 110 may determine to provide the first virtual content of the digital game to the first user at the save point such that the first user may resume the progress made in the digital game. The first user may be enabled to continue with the first virtual content without having to start the first virtual content from the first initial state.

In some implementations, the progress made by the first user while at, near, or inside the first vehicle may be saved by updating the progress information of the first virtual content of the first user. The first user at, near, or inside the second vehicle of the set of one or more vehicles at a second point in time may be provided with the first virtual content and enable to continue from the progress made while at, near, or inside the first vehicle. The second point in time may occur after the first point in time. For example, the progress made in the first session while at, near, or inside the first vehicle may be saved by updating the progress information of the first virtual content. of the first user. The user may continue the progress made in the first session in the second session while at, near, or inside the second vehicle.

In some implementations, determination component 110 may determine to provide the first user with first virtual content such that the first user may begin interacting with the first virtual content at the initial state if the user has not made any progress in the first virtual content and/or if the progress made in the first virtual content by the first user was reset. For example, the first virtual content may begin at the initial state at the first session prior to any progress being made in the first virtual content.

In some implementations, determination component 110 may determine to provide the first user with the first virtual content based on the progress made in the previous session until the first goal state is achieved or if the progress made by the first user is reset.

Presentation component 112 may be configured to provide the first user and/or other users at, near, or inside the set of one or more vehicles with the set of virtual content and/or other information. Presentation component 112 may be configured to provide the first user at, near, or inside the set of one or more vehicles with the virtual content of the set of virtual content determined by the determination component 110. Presentation component 112 may be configured to provide the first user at, near, or inside the set of one or more vehicles with the portion of the set of virtual content determined by the determination component 110. Presentation component 112 may be configured to provide the first user with the set of virtual content such that the first user may interact with the virtual content provided to achieve the goal state of the set of virtual content. Presentation component 112 may be configured to provide the first user at, near, or inside the first vehicle and/or other vehicles of the set of one or more vehicles with the portion of the set of virtual content determined by the determination component 110.

Presentation component 112 may be configured to provide the first virtual content such that the first user may participate in the first virtual content provided in one or more sessions. Presentation component 112 may be configured to provide the first user with the determined portion of the set of virtual content such that the first user may start the first session in the virtual content provided and/or continue the progress made in the first session in the virtual content provided in the second session of the virtual content provided.

In some implementations, presentation component 112 may be configured to provide the first user with the first virtual content such that the first user may view, interact with, and/or participate in the provided first virtual content. Presentation component 112 may be configured to provide the first virtual content such that the first user may participate in the first virtual content provided in one or more sessions. The first user's participation with the provided first virtual content may result in progress in the first virtual content. The first user's participation in the first virtual content in the sessions may result in progress toward the first goal state of the first virtual content. Presentation component 112 may be configured to provide the first user with the first virtual content responsive to the detection of the first user within the first vehicle.

Presentation component 112 may be configured to provide the first user with the first virtual content by causing presentation of the first virtual content. Presentation component 112 may be configured to provide information of the first virtual content to the first client computing platform, the first vehicle, and/or on the other devices, such that the first virtual content may be presented. In some implementations, the presentation of the first virtual content may be on the first client computing platform of the first user. For example, the presentation of the first virtual content may be on the display and/or audio output devices of the first client computing platform. In some implementations, the presentation of the first virtual content may be on the first vehicle. For example, the presentation of the first virtual content may be on the output devices of the first vehicle. The first user may provide user input for participating in the first virtual content via the input devices on the first client computing platform or the first vehicle. Presentation component 112 may be configured to obtain the user input for participating in the first virtual content.

In some implementations, presentation component 112 may be configured to provide the first user and/or other users at, near, or inside the set of one or more vehicles with the set of physical effects concurrently with the set of virtual content. Presentation component 112 may be configured to provide the physical effects correspond to the context of content provided by the set of virtual content. In some implementations, presentation component 112 may determine the context of content provided by the set of virtual content and concurrently provide the physical effects correspond to the context of content provided by the set of virtual content. By way of non-limiting example, if the virtual content provided includes a vehicle hitting an object, the physical effects of force feedback of the impact on the object may be provided concurrently with the impact on the object.

Progress component 114 may be configured to effectuate an update of the progress information for the first user. Progress component 114 may be configured to monitor the progress made by the first user in the set of virtual content. Progress may be made by the first user in the set of virtual content based on user interaction with the set of virtual content. Progress component 114 may be configured to monitor the progress made by the first user in the first virtual content and/or other virtual content. Progress may be made by the first user in the first virtual content based on user interaction with the first virtual content.

In some implementations, progress component 114 may be configured to effectuate an update of the progress information of the first user for the first virtual content based on the progress made by the first user in the first virtual content. Progress component 114 may be configured to effectuate the update of the progress information of the first user for the first virtual content based on the progress made by the first user toward the first goal state of the first virtual content.

In some implementations, progress component 114 may be configured to effectuate the update of the progress information for the first user based on the progress made by the first user in the first session, the second session, and/or other sessions of the user's participation the first virtual content. Progress component 114 may be configured to effectuate the update of the progress information contemporaneously with the progress made by the first user in the first virtual.

Progress component 114 may be configured to determine the progress made by the first user in the first virtual content based on the user interaction with the first virtual content. Responsive to progress being made by the first user in the first virtual content, progress component 114 may be configured to effectuate an update of the progress information of the first user for the first virtual content. Progress component 114 may be configured to effectuate an update of the progress information by overwriting the progress information stored in electronic storage 122. Progress component 114 may be configured to effectuate an update of the progress information by storing the updated progress information in electronic storage 122. Progress component 114 may be configured to effectuate an update of the progress information of the first user for the first virtual content such that the progress made by the first user may be saved. The progress made by the first user in the first virtual content may be saved such that the first user may resume from the progress made in the first virtual content when the first virtual content may be provided to the first user at, near, or inside the set of one or more vehicles.

In some implementations, server(s) 102, vehicle(s) 140, and/or external resource(s) 120 may be operatively linked via one or more electronic communication links. For example, such electronic communication links may be established, at least in part, via a network 103 such as the Internet and/or other networks. It will be appreciated that this is not intended to be limiting, and that the scope of this disclosure may include implementations in which server(s) 102, vehicle (s) 140, and/or external resource(s) 120 may be operatively linked via some other communication media.

In some implementations, external resource(s) 120 may include sources of information, hosts and/or providers of virtual environments outside of system 100, external entities participating with system 100, and/or other resources. In some implementations, some or all of the functionality attributed herein to external resource(s) 120 may be provided by resources included in system 100.

In some implementations, Server(s) 102 may include electronic storage(s) 122, processor(s) 124, and/or other components. Server(s) 102 may include communication lines or ports to enable the exchange of information with a network and/or other computing devices. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing devices operating together as server(s) 102.

In some implementations, electronic storage(s) 122 may include electronic storage media that electronically stores information. The electronic storage media of electronic storage(s) 122 may include one or both of system storage that is provided integrally (i.e., substantially nonremovable) with server(s) 102 and/or removable storage that is removably connectable to server(s) 102 via, for example, a port (e.g., a USB port, a firewire port, etc.) or a drive (e.g., a disk drive, etc.). Electronic storage(s) 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage(s) 122 may include one or more virtual storage resources (e.g., cloud storage, a virtual private network, and/or other virtual storage resources). Electronic storage(s) 122 may store software algorithms, information determined by processor(s) 124, information received from server(s) 102, information received from vehicle(s) 140, and/or other information that enables server(s) 102 to function as described herein.

In some implementations, processor(s) 124 may be configured to provide information processing capabilities in server(s) 102. As such, processor(s) 124 may include one or more of a digital processor, an analog processor, a digital circuit designed to process information, an analog circuit designed to process information, a state machine, and/or other mechanisms for electronically processing information. Although processor(s) 124 is shown in FIG. 1 as a single entity, this is for illustrative purposes only. In some implementations, processor(s) 124 may include a plurality of processing units. These processing units may be physically located within the same computing platform, or processor(s) 124 may represent processing functionality of a plurality of devices operating in coordination. The processor(s) 124 may be configured to execute computer-readable instruction components 106, 108, 110, 112, 114, 116, and/or other components. The processor(s) 124 may be configured to execute components 106, 108, 110,112, 114, 116, and/or other components by software; hardware; firmware; some combination of software, hardware, and/or firmware; and/or other mechanisms for configuring processing capabilities on processor(s) 124.

It should be appreciated that although components 106, 108, 110, 112, 114, and 116 are illustrated in FIG. 1 as being co-located within a single processing unit, in implementations in which processor(s) 124 may include multiple processing units, one or more of components 106, 108, 110, 112, 114, and/or 116 may be located remotely from the other components. The description of the functionality provided by the different components 106, 108, 110, 112, 114, and/or 116 described herein is for illustrative purposes, and is not intended to be limiting, as any of components 106, 108, 110, 112, 114, and/or 116 may provide more or less functionality than is described. For example, one or more of components 106, 108, 110, 112, 114, and/or 116 may be eliminated, and some or all of its functionality may be provided by other ones of components 106, 108, 110, 112, 114, and/or 116. As another example, processor(s) 124 may be configured to execute one or more additional components that may perform some or all of the functionality attributed herein to one of components 106, 108, 110, 112, 114, and/or 116.

Figure 3B:
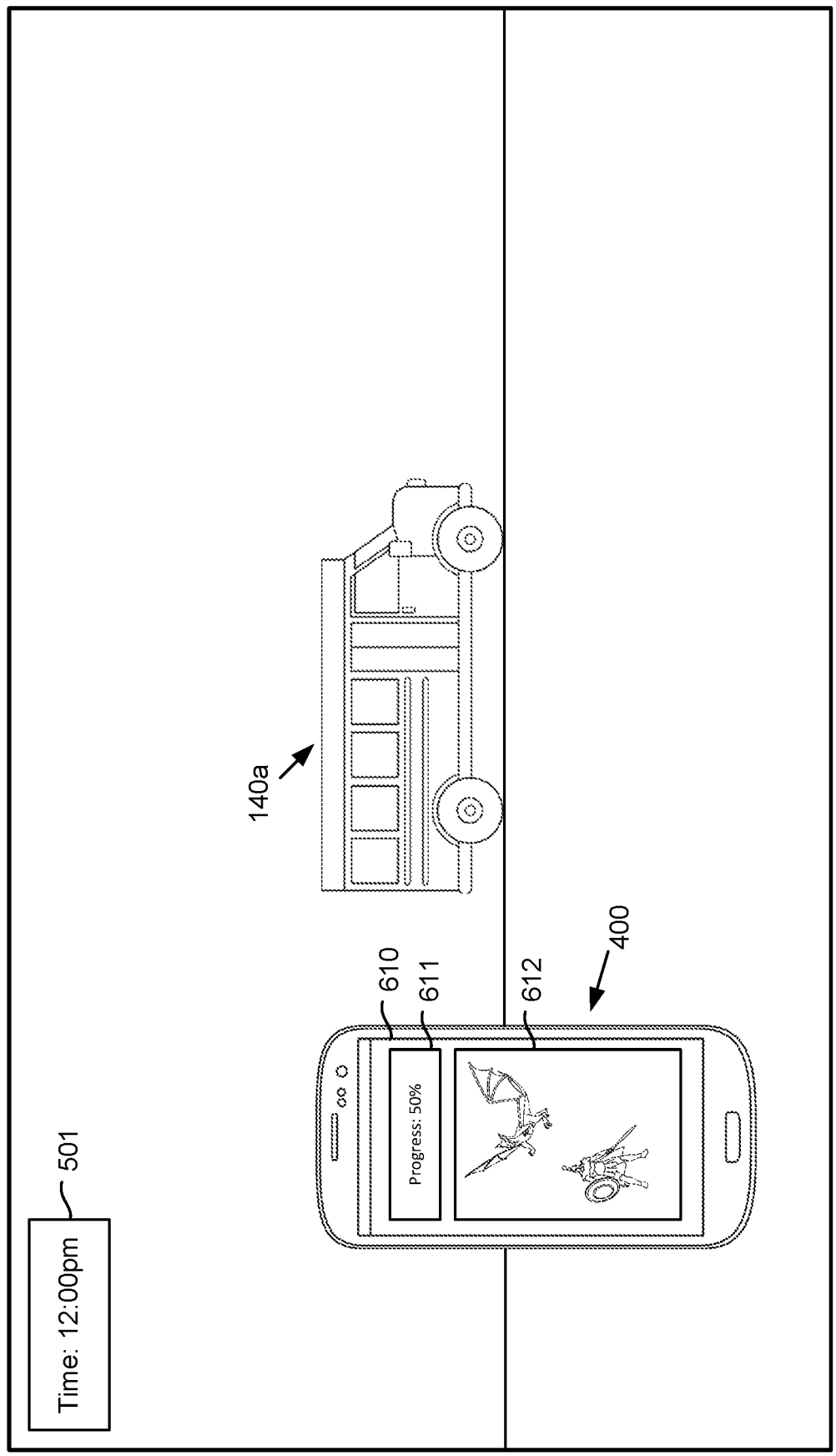
FIG. 3B illustrates the first user provided with the first virtual content at, near, or inside the first vehicle in a first session, in accordance with one or more implementations.

FIG. 3A illustrates a first user 300 at, near, or inside a set of one or more vehicles. The set of one or more vehicles may include a first vehicle 140*a*, a second vehicle 140*b*, and/or other vehicles. First user 300 may be associated with a first client computing device 400. First client computing device 400 may be configured to communicate with server(s) 102, the set of one or more vehicles, and/or other devices. First client computing device 400 may communicate the real-world location of first user 300, the identity of first user 300, and/or other information. First user 300 may be provided with the set of virtual content stored in electronic storage 122 and/or other storage locations. First user 300 may be provided with a first virtual content 610 (depicted in FIG. 3B) of the set of virtual content when first user 300 may be at, near, or inside first vehicle 140*a*. First user 300 in proximity and/or in first vehicle 140*a* at a time 501 may be provided with first virtual content 610.

Figure 4A:
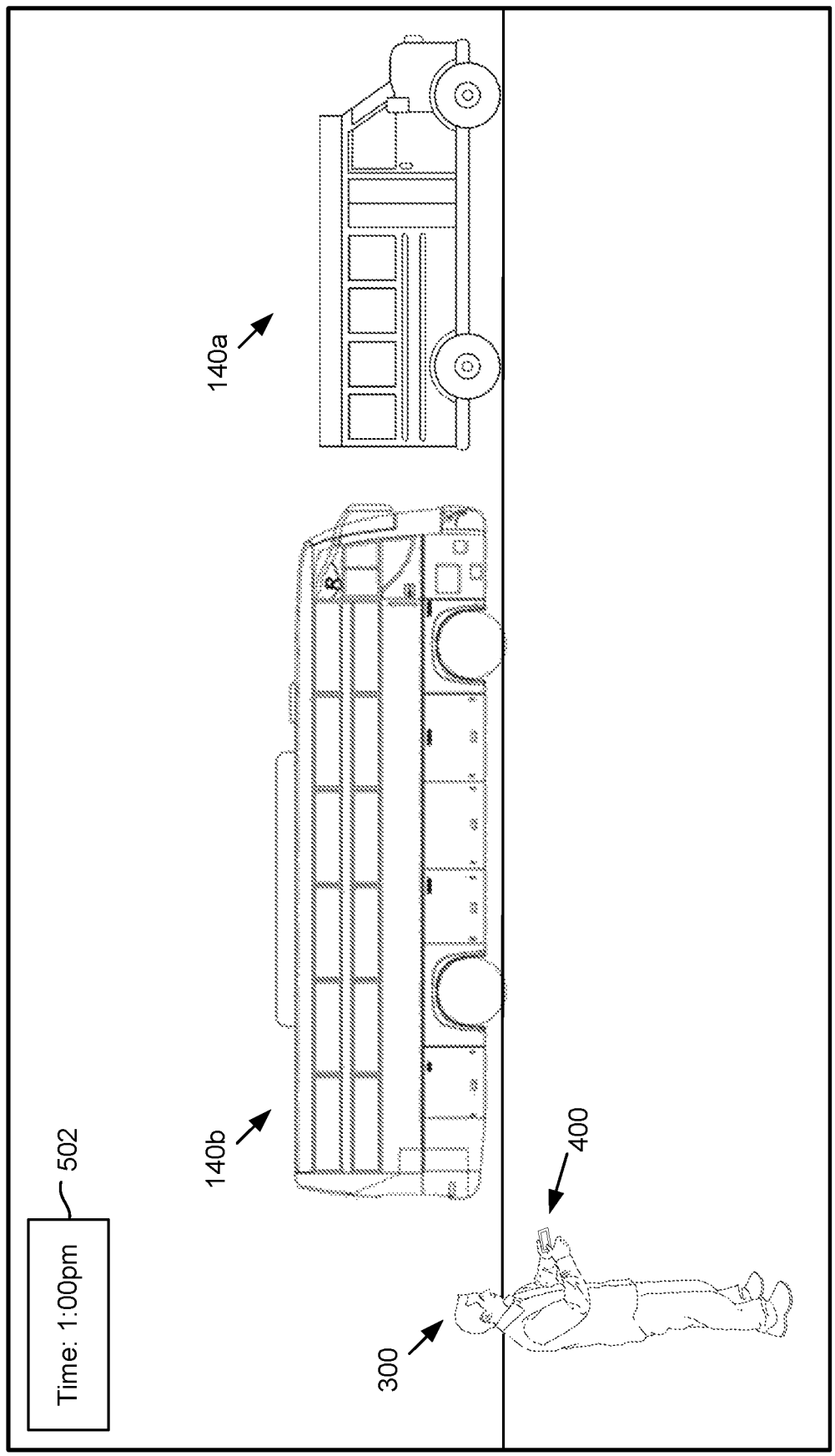
FIG. 4A illustrates the first user at, near, or inside a second vehicle of the set of one or more vehicles, in accordance with one or more implementations.

FIG. 3B illustrates a view of first virtual content 610 presented on first client computing device 400 while first user 300 may be at, near, or inside first vehicle 140*a*. First user 300 being provided with first virtual content 610 at, near, or inside first vehicle 140*a* on first client computing device 400. First vehicle 140*a* may be in operation. For example, first vehicle 140*a* may be being driven, and first user 300 may be riding in first vehicle 140*a*. First virtual content 610 may be presented on a user interface on first client computing device 400. First virtual content 610 may include a digital game 612, a progress indicator 611, and/or other components. First virtual content 610 may include an initial state and a goal state. The initial state may be the state of the first virtual content 610 prior to the commencement of user interaction with first virtual content 610. For example, the initial state may be the state of the first virtual content 610 with 0% progress. The initial state may be the beginning of digital game 612. The goal state of the first virtual content 610 may be an achievable goal within first virtual content 610. The goal state may be the ending digital game 612. For example, the goal state may be the state of the first virtual content 610 with a 100% progress. Progress indicator 611 may indicate the progress made by the user in digital game 612 toward the goal state of first virtual content 610. First user 300 may achieve progress of 50% at time 501 while at, near, or inside first vehicle 140*a* as indicated by progress indicator 611. The progress made by first user 300 at time 501 while at, near, or inside first vehicle 140*a* may be saved when first user 300 cease to progress in digital game 612. The progress made by first user 300 at time 501 may be in a first session of the digital game 612. FIG. 4A illustrates the first user at, near, or inside second vehicle 140*b* of the set of one or more vehicles at time 502. First user 300 in proximity and/or in second vehicle 140*b* may be provided with first virtual content 610. First user 300 may be provided with first virtual content 610 such that first user 300 may continue with the progress made in first virtual content 610 at time 501 at time 502.

Figure 4B:
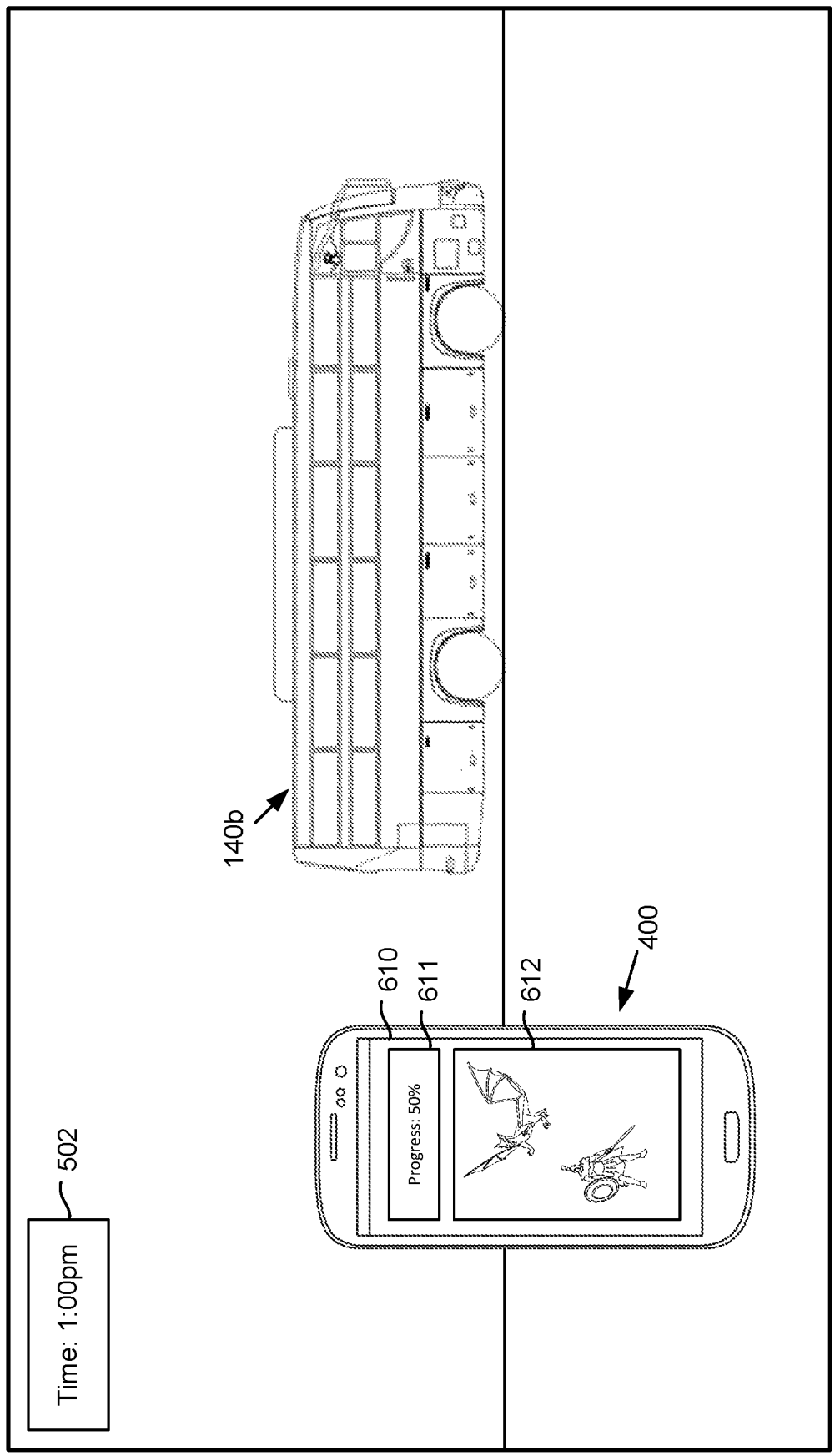
FIG. 4B illustrates the first user provided with the first virtual content at, near, or inside the second vehicle in a second session, in accordance with one or more implementations.

FIG. 4B illustrates a view of first virtual content 610 presented on first client computing device 400 while first user 300 may be at, near, or inside second vehicle 140*b*. First user 300 being provided with first virtual content 610 at, near, or inside second vehicle 140*b* on first client computing device 400. Second vehicle 140*b* may be in operation. For example, second vehicle 140*b* may be being driven, and first user 300 may be riding in second vehicle 140*b*. First user 300 may be provided with first virtual content 610 such that first user 300 may continue with the progress made in first virtual content 610 at time 501 at time 502. First user 300 may have achieved at time 501 while at, near, or inside first vehicle 140*a* may be saved and at 50%. First user 300 may be provided with first virtual content 610 at time 502 with the progress of 50% such that first user 300 may continue the progress made by time 501 at time 502. First user 300 may be provided with first virtual content 610 at time 502 with the progress of 50% such that may continue toward the goal state of first virtual content 610 without having to start from the initial state. First user 300 may be provided with first virtual content 610 at time 502 may be a second session of the digital game 612. The second session may be a point in time after first user 300 participating the in the first session at time 501.

Although FIGS. 3B and 4B illustrations first virtual content 610 being presented on first client computing device 400, this is not intended to be limiting. In some implementations, first virtual content 610 may be presented on a presentation device of the vehicles of the set of one or more vehicles first user 300 may be at, near, or inside. For example, first user 300 may be provided with first virtual content 610 presented on a presentation of first vehicle 140*a* while at, near, or inside first vehicle 140*a*, and first user 300 may be provided with first virtual content 610 presented on a presentation of second vehicle 140*b* while at, near, or inside second vehicle 140*b*.

Figure 2:
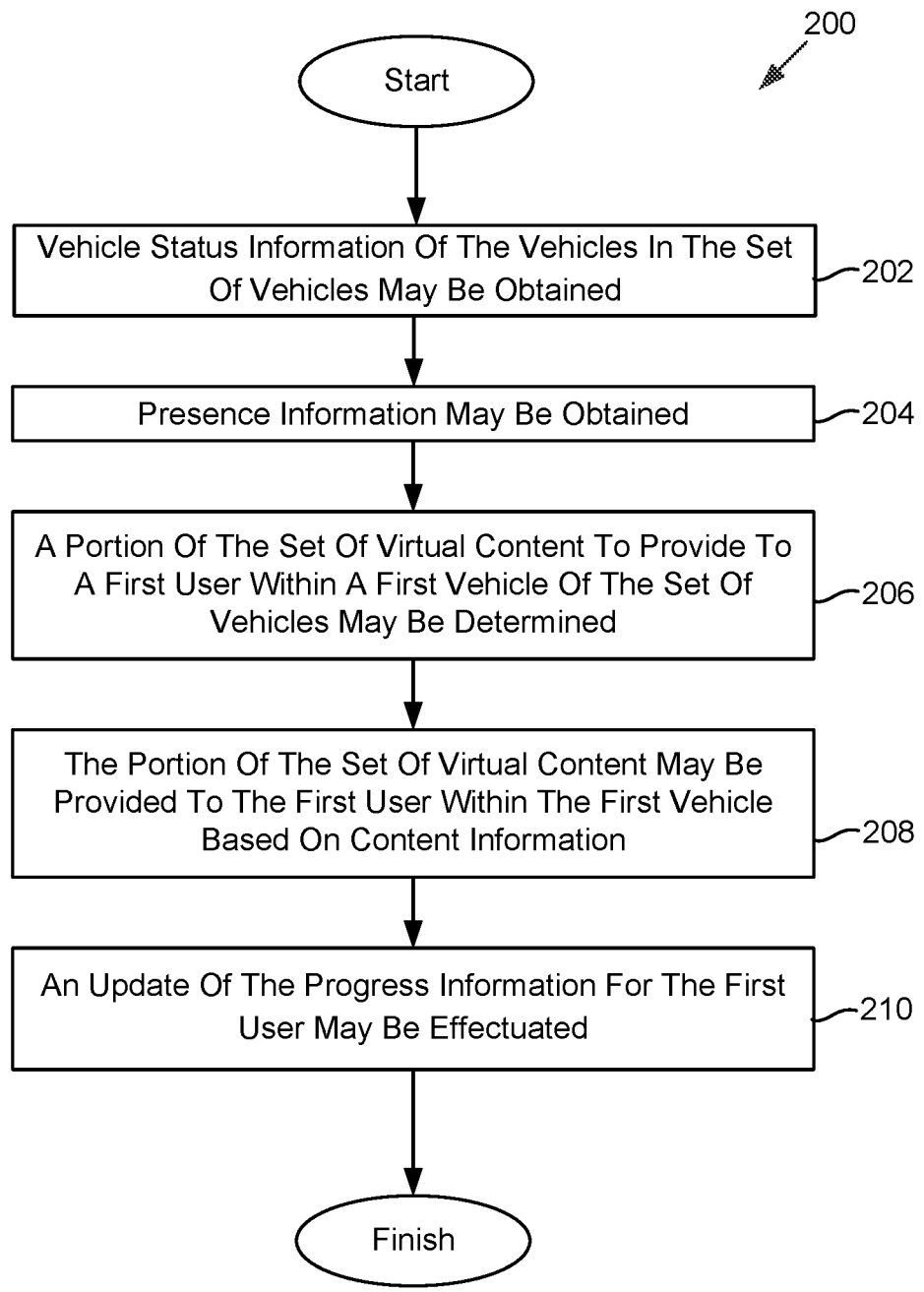
FIG. 2 illustrates a method for providing users with interactive experiences on a set of one or more vehicles, in accordance with one or more implementations.

FIG. 2 illustrates a method 200 for providing users with interactive experiences on a set of one or more vehicles. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below are not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, vehicle status information of the vehicles in the set of one or more vehicles may be obtained. The vehicle status information may specify the real-world location and/or operation mode of the individual vehicles in the set of one or more vehicles. In some embodiments, operation 202 is performed by a vehicle component the same as or similar to vehicle component 106 (shown in FIG. 1 and described herein).

At an operation 204, presence information may be obtained. The presence information may indicate the presence of the individual users in the individual vehicles in the set of one or more vehicles. In some embodiments, operation 204 is performed by a detection component the same as or similar to a detection component 108 (shown in FIG. 1 and described herein).

At an operation 206, a portion of the set of virtual content to provide to a first user within a first vehicle of the set of one or more vehicles may be determined. The portion of the set of virtual content to provide to the first user within the first vehicle of the set of one or more vehicles may be determined may be responsive to the presence information indicating presence of the first user in a first vehicle and further responsive to the vehicle status information specifying the first vehicle being at a given real-world location with a given operation mode. The portion of the set of virtual content to be provided to the first user within the first vehicle may be based on progress information for the first user and the vehicle status information for the first vehicle. The progress information may specify progress of individual users within the set of virtual content such that the progress information specifies progress of the first user within the set of virtual content between an initial state of the set of virtual content and a goal state of the set of virtual content. The initial state of the set of virtual content may be the state of the set of virtual content for the first user prior to the commencement of user interaction with the set of virtual content by the first user. The goal state of the set of virtual content may be achievable within the set of virtual content by the first user through user interaction with the set of virtual content. In some embodiments, operation 206 is performed by a determination component the same as or similar to determination component 112 (shown in FIG. 1 and described herein).

At an operation 208, the portion of the set of virtual content may be provided to the first user within the first vehicle based on content information. The content information may define the set of virtual content for presentation within the set of one or more vehicles during operation. In some embodiments, operation 208 is performed by a presentation component the same as or similar to presentation component 114 (shown in FIG. 1 and described herein).

At an operation 210, an update of the progress information for the first user may be effectuated. The update of the progress information for the first user may be effectuated responsive to user interaction of the first user with the portion of the set of virtual content within the first vehicle resulting in progress by the first user toward the goal state of the set of virtual content. In some embodiments, operation 210 is performed by a progress component the same as or similar to progress compost 116 (shown in FIG. 1 and described herein).

Although the system(s) and/or method(s) of this disclosure have been described in detail for the purpose of illustration based on what is currently considered to be the most practical and/or preferred implementations, it is to be understood that such detail is solely for that purpose and/or that the disclosure is not limited to the disclosed implementations, but, on the contrary, is intended to cover modifications and/or equivalent arrangements that are within the spirit and/or scope of the appended claims. For example, it is to be understood that the present disclosure contemplates that, to the extent possible, one or more features of any implementation can be combined with one or more features of any other implementation.

What is claimed:

1. A system configured to provide users with interactive experiences, the system comprising:
   electronic storage configured to store content information and progress information, the content information defining a set of virtual content for presentation within a set of vehicles during operation, and the progress information specifying progress of individual users within the set of virtual content such that the progress information specifies the progress of a first user within the set of virtual content between an initial state of the set of virtual content and a goal state of the set of virtual content, the initial state of the set of virtual content being a state of the set of virtual content for the first user prior to commencement of user interaction with the set of virtual content by the first user, and the goal state of the set of virtual content being achievable within the set of virtual content by the first user through the user interaction with the set of virtual content;
   one or more physical processors configured by machine-readable instructions to:
     obtain vehicle status information of individual vehicles in the set of vehicles, the vehicle status information specifying real-world location and/or operation mode of the individual vehicles in the set of vehicles;
     obtain presence information indicating presence of the individual users in the individual vehicles in the set of vehicles;
     responsive to the presence information indicating the presence of the first user in a first vehicle and further responsive to the vehicle status information specifying the first vehicle is at a first real-world location with a first operation mode, determine a portion of the set of virtual content to provide to the first user within the first vehicle, wherein the portion of the set of virtual content to be provided to the first user within the first vehicle is based on the progress information for the first user and the vehicle status information for the first vehicle;
     provide the portion of the set of virtual content to the first user within the first vehicle;
     responsive to the user interaction of the first user with the portion of the set of virtual content within the first vehicle resulting in the progress by the first user toward the goal state of the set of virtual content, effectuate an update of the progress information for the first user to generate updated progress information; and
     responsive to the presence information indicating the presence of the first user in a second vehicle and further responsive to the vehicle status information specifying the second vehicle is at a second real-world location with a second operation mode:
       determine a second portion of the set of virtual content to provide to the first user within the second vehicle based on the updated progress information for the first user and the vehicle status information for the second vehicle;
       provide the second portion of the set of virtual content to the first user within the second vehicle; and
       responsive to second user interaction of the first user with the second portion of the set of virtual content within the second vehicle resulting in the progress by the first user toward the goal state of the set of virtual content, effectuate a further update of the updated progress information for the first user to generate further updated progress information.

2. The system of claim 1, wherein the presence information indicating the presence of the first user in the second vehicle is at a point in time after the presence of the first user in the first vehicle.

3. The system of claim 1, wherein the further updated progress information is still further updated based on the user interaction of the first user with the set of virtual content within the second vehicle and/or other vehicles until one or more of the individual users reach the goal state of the set of virtual content.

4. The system of claim 1, wherein the operation mode of the individual vehicles in the set of vehicles indicates whether the individual vehicles are being driven.

5. The system of claim 1, wherein the user interaction with the set of virtual content by the first user includes playing a video game or viewing a video.

6. The system of claim 1, wherein the first user at, near, or inside the set of vehicles is a passenger of the set of vehicles.

7. The system of claim 1, wherein the progress made by the first user toward the goal state is based on satisfaction of one or more criteria.

8. The system of claim 7, wherein the one or more criteria include one or both of completing one or more tasks within the set of virtual content or completing one or more tasks in a real-world environment.

9. The system of claim 1, wherein a theme of the set of virtual content provided to the first user is based on user information of the first user.

10. A method configured to provide users with interactive experiences, the method comprising:
 obtaining vehicle status information of individual vehicles in a set of vehicles, the vehicle status information specifying real-world location and/or operation mode of the individual vehicles in the set of vehicles;
 obtaining presence information indicating presence of individual users in the individual vehicles in the set of vehicles;
 responsive to the presence information indicating the presence of a first user in a first vehicle and further responsive to the vehicle status information specifying the first vehicle is at a first real-world location with a first operation mode, determining a portion of the set of virtual content to provide to the first user within the first vehicle, wherein the portion of the set of virtual content to be provided to the first user within the first vehicle is based on progress information for the first user and the vehicle status information for the first vehicle, the progress information specifying progress of the individual users within the set of virtual content such that the progress information specifies the progress of the first user within the set of virtual content between an initial state of the set of virtual content and a goal state of the set of virtual content, the initial state of the set of virtual content being a state of the set of virtual content for the first user prior to commencement of user interaction with the set of virtual content by the first user, and the goal state of the set of virtual content being achievable within the set of virtual content by the first user through the user interaction with the set of virtual content;
 providing the portion of the set of virtual content to the first user within the first vehicle based on content information, the content information defining the set of virtual content for presentation within the set of vehicles during operation;
 responsive to the user interaction of the first user with the portion of the set of virtual content within the first vehicle resulting in the progress by the first user toward the goal state of the set of virtual content, effectuating an update of the progress information for the first user to generate updated progress information; and
 responsive to the presence information indicating the presence of the first user in a second vehicle and further responsive to the vehicle status information specifying the second vehicle is at a second real-world location with a second operation mode:
  determining a second portion of the set of virtual content to provide to the first user within the second vehicle based on the updated progress information for the first user and the vehicle status information for the second vehicle;
  providing the second portion of the set of virtual content to the first user within the second vehicle; and
  responsive to second user interaction of the first user with the second portion of the set of virtual content within the second vehicle resulting in the progress by the first user toward the goal state of the set of virtual content, effectuating a further update of the updated progress information for the first user to generate further updated progress information.

11. The method of claim 10, wherein the presence information indicating the presence of the first user in the second vehicle is at a point in time after the presence of the first user in the first vehicle.

12. The method of claim 10, wherein the further updated progress information is still further updated based on the user interaction of the first user with the set of virtual content within the second vehicle and/or other vehicles until one or more of the individual users reach the goal state of the set of virtual content.

13. The method of claim 10, wherein the operation mode of the individual vehicles in the set of vehicles indicates whether the individual vehicles are being driven.

14. The method of claim 10, wherein the user interaction with the set of virtual content by the first user includes playing a video game or viewing a video.

15. The method of claim 10, wherein the first user at, near, or inside the set of vehicles is a passenger of the set of vehicles.

16. The method of claim 10, wherein the progress made by the first user toward the goal state is based on satisfaction of one or more criteria.

17. The method of claim 16, wherein the one or more criteria include one or both of completing one or more tasks within the set of virtual content or completing one or more tasks in a real-world environment.

18. The method of claim 10, wherein a theme of the set of virtual content provided to the first user is based on user information of the first user.

* * * * *